(12) United States Patent
Mitani et al.

(10) Patent No.: US 11,021,056 B2
(45) Date of Patent: Jun. 1, 2021

(54) WORK VEHICLE

(71) Applicant: Yanmar Co., Ltd., Osaka (JP)

(72) Inventors: Shuichi Mitani, Osaka (JP); Yoshiaki Kurokawa, Osaka (JP)

(73) Assignee: YANMAR POWER TECHNOLOGY CO., LTD., Osaka (JP)

( * ) Notice: Subject to any disclaimer, the term of this patent is extended or adjusted under 35 U.S.C. 154(b) by 289 days.

(21) Appl. No.: 16/090,490

(22) PCT Filed: Aug. 19, 2016

(86) PCT No.: PCT/JP2016/003793
§ 371 (c)(1),
(2) Date: Oct. 1, 2018

(87) PCT Pub. No.: WO2017/168471
PCT Pub. Date: Oct. 5, 2017

(65) Prior Publication Data
US 2019/0111782 A1   Apr. 18, 2019

(30) Foreign Application Priority Data

Mar. 30, 2016 (JP) .............................. JP2016-068154

(51) Int. Cl.
*B60K 20/02* (2006.01)
*B60K 17/10* (2006.01)
(Continued)

(52) U.S. Cl.
CPC .............. *B60K 20/02* (2013.01); *B60K 17/10* (2013.01); *B60K 23/00* (2013.01); *B60K 26/02* (2013.01);
(Continued)

(58) Field of Classification Search
CPC combination set(s) only.
See application file for complete search history.

(56) References Cited

U.S. PATENT DOCUMENTS 6,237,711 B1 * 5/2001 Hunt ..................... B60W 30/18
180/315
7,104,036 B2 * 9/2006 Trefz ................... A01D 69/002
56/10.2 R

FOREIGN PATENT DOCUMENTS

JP   1980-104532 U   7/1980
JP   01-257634 A    10/1989
(Continued)

OTHER PUBLICATIONS

International Search Report dated Nov. 8, 2016 issued in corresponding PCT Application PCT/JP2016/003793.
(Continued)

*Primary Examiner* — Alan D Hutchinson
(74) *Attorney, Agent, or Firm* — Norton Rose Fulbright US LLP

(57) ABSTRACT

A work vehicle including a floor, a forward pedal arm, a reverse pedal arm, a forward rotation shaft, and a reverse rotation shaft. The floor has a first insertion hole and a second insertion hole. The forward pedal arm is placed in the first insertion hole and provided with a forward pedal. The reverse pedal arm is placed in the second insertion hole and provided with a reverse pedal. The forward rotation shaft serves as a rotation shaft of the forward pedal arm, and is oriented so that an outer end thereof is directed toward the rear of a vehicle body of the work vehicle. The reverse rotation shaft serves as a rotation shaft of the reverse pedal arm, and is oriented so that an outer end thereof is directed toward the rear of the vehicle body.

8 Claims, 13 Drawing Sheets

(51) Int. Cl.
  *B60W 10/103* (2012.01)
  *G05G 1/38* (2008.04)
  *B60K 26/02* (2006.01)
  *G05G 1/46* (2008.04)
  *B62D 49/06* (2006.01)
  *B60K 23/00* (2006.01)
  *G05G 1/36* (2008.04)
  *F16H 59/02* (2006.01)
  *G05G 5/05* (2006.01)

(52) U.S. Cl.
  CPC ....... *B60W 10/103* (2013.01); *B62D 49/0692* (2013.01); *G05G 1/36* (2013.01); *G05G 1/38* (2013.01); *G05G 1/46* (2013.01); *B60K 2023/005* (2013.01); *B60K 2026/026* (2013.01); *B60Y 2200/22* (2013.01); *B60Y 2200/221* (2013.01); *B60Y 2200/222* (2013.01); *F16H 2059/0234* (2013.01); *G05G 5/05* (2013.01); *Y10T 74/20061* (2015.01); *Y10T 74/20888* (2015.01)

(56) References Cited

FOREIGN PATENT DOCUMENTS

| | | |
|---|---|---|
| JP | 2002-114051 A | 4/2002 |
| JP | 2002-295634 A | 10/2002 |
| JP | 2007-139126 A | 6/2007 |
| JP | 2009-132309 A | 6/2009 |
| JP | 5350891 B | 11/2013 |
| JP | 2014-008836 A | 1/2014 |
| WO | 2407/039940 A1 | 4/2007 |

OTHER PUBLICATIONS

Extended European Search Report dated Sep. 27, 2019 to EPC Patent Application No. 16896692.7.

\* cited by examiner

WORK VEHICLE

CROSS REFERENCES TO RELATED APPLICATIONS

This application is a national stage application pursuant to 35 U.S.C. § 371 of International Application No. PCT/JP2016/003793, filed on Aug. 19, 2016 which claims priority of under 35 U.S.C. § 119 to Japanese Patent Application No. 2016-068154 filed on Mar. 30, 2016, the disclosures of which are hereby incorporated by reference in their entireties.

TECHNICAL FIELD

The present invention mainly relates to a work vehicle including a forward pedal and a reverse pedal.

BACKGROUND ART

A known configuration of a work vehicle such as a tractor includes a forward pedal (forward-travel pedal) and a reverse pedal (reverse-travel pedal) disposed at the bottom of a driver seat so that an operator can operate the forward pedal and the reverse pedal to thereby perform forward and reverse travel of a vehicle body. Patent Literatures 1 through 4 (PTLs 1 through 4) disclose work vehicles of this type.

In the work vehicle of PTL 1, a forward pedal and a reverse pedal are connected to the same rod to which a rotation shaft is connected. In the work vehicle of PTL 2, each of a forward pedal and a reverse pedal is connected to a rotational shaft disposed above the floor. In the work vehicles of PTLs 3 and 4, each of a forward pedal and a reverse pedal is connected to a rotation shaft disposed below the floor. In the work vehicle of PTL 4, a forward pedal and a reverse pedal are supported on pedal brackets that are attached to the floor.

CITATION LIST

Patent Literatures

PTL 1: Japanese Patent Application Laid-Open No. 2002-295634
PTL 2: Japanese Patent Application Laid-Open No. 2014-8836
PTL 3: Japanese Patent Application Laid-Open No. 2002-114051
PTL 4: Japanese Patent No. 5350891

SUMMARY OF INVENTION

Technical Problem

Here, the forward pedal and the reverse pedal are disposed at the left or right of the driver seat, and thus, the operator presses the forward pedal the reverse pedal with his or her legs open. In the work vehicles of PTLs 1 through 4, however, the axial directions of rotational shafts of the forward pedal and the reverse pedal coincide with the left-right direction (lateral direction) of the vehicle body. Accordingly, a direction in which the operator presses each pedal shifts from a direction of rotation of the pedal, and thus, operability thereof is susceptible to enhancement.

The present invention has been made in view of the circumstances described above, and a primary object of some aspects of the invention is to provide a work vehicle with enhanced operability of a forward pedal and a reverse pedal.

Solution to Problem and Advantages

Problems to be solved by some aspects of the present invention have been described above, and solutions for the problems and advantages of the solutions will be described below.

An aspect of the present invention provides a work vehicle having the following configuration. Specifically, the work vehicle includes a floor, a forward pedal arm, a reverse pedal arm, a forward rotation shaft, a reverse rotation shaft, a base portion, and a transmission device. The floor is a member having a first insertion hole and a second insertion hole, and a foot of the operator is placed on the floor. The forward pedal arm is placed in the first insertion hole and provided with a forward pedal. The reverse pedal arm is placed in the second insertion hole and provided with a reverse pedal. The forward rotation shaft serves as a rotation shaft of the forward pedal arm and is oriented to tilt toward rear of a vehicle body as approaching a laterally outside of the vehicle body. The reverse rotation shaft serves as a rotation shaft of the reverse pedal arm and is oriented to tilt toward rear of the vehicle body as approaching the laterally outside of the vehicle body. The base portion is attached to the floor and supports the forward pedal arm, the reverse pedal arm, the forward rotation shaft, and the reverse rotation shaft. The transmission device performs gear shift in accordance with an operating force applied to each of the forward pedal and the reverse pedal.

Accordingly, since the rotation shafts of the forward pedal and the reverse pedal tilt as described above, the direction in which the operator applies a force coincides with the rotation direction of the pedals. Thus, operability can be enhanced. In addition, since all the pedal arms and rotation shafts are supported on the base portion, mechanisms concerning the pedals can be concentrated. Thus, the members can be easily assembled to the vehicle body.

The work vehicle preferably has the following configuration. Specifically, the work vehicle includes a coupling link. The coupling link rotates in a first direction when receiving an operating force that rotates the forward pedal in a direction away from the operator, and rotates in a second direction opposite to the first direction when receiving an operating force that rotates the reverse pedal in the direction away from the operator. When the forward pedal is rotated in the direction away from the operator, the operating force that rotates the forward pedal in the direction away from the operator is transmitted to the reverse pedal through the coupling link so that the reverse pedal rotates toward the operator. When the reverse pedal is rotated in the direction away from the operator, the operating force that rotates the reverse pedal in the direction away from the operator is transmitted to the forward pedal through the coupling link so that the forward pedal rotates toward the operator.

In this manner, when one of the forward pedal and the reverse pedal is rotated away from the operator, the other pedal can be rotated toward the operator. Thus, the state where engine power is transmitted to the forward-traveling side and the state where the engine power is transmitted to the reverse-traveling side can be clearly distinguished from each other. Thus, the configuration can be simplified.

The work vehicle described above preferably includes a biasing member that biases the coupling link in the second direction when the coupling link rotates in the first direction, and biases the coupling link in the first direction when the coupling link rotates in the second direction.

Accordingly, structures for returning the forward pedal and the reverse pedal can be concentrated in the coupling link. Consequently, the configuration can be simplified.

The work vehicle preferably has the following configuration. Specifically, the forward rotation shaft and the reverse rotation shaft have a common center position. The work vehicle includes a forward interlocked link, a reverse interlocked link, and an accelerator interlocked mechanism. The forward interlocked link rotates when receiving an operating force through the forward rotation shaft. The reverse interlocked link rotates when receiving an operating force through the reverse rotation shaft. The accelerator interlocked mechanism is supported on the base portion and is configured to increase an engine speed when receiving an operating force through the forward interlocked link or the reverse interlocked link.

In this manner, not only the transmission device but also the engine speed can be controlled in an interlocked manner by operating any one of the forward pedal and the reverse pedal. In addition, since the accelerator interlocked mechanism is supported on the base portion, mechanisms concerning the pedals can be concentrated.

The work vehicle preferably has the following configuration. Specifically, the work vehicle includes an accelerator operation tool that enables the operator to perform an operation of increasing the engine speed. The accelerator interlocked mechanism includes an accelerator interlocked link and an accelerator interlocked wire. The accelerator interlocked link is attached to be rotatable independently of the forward rotation shaft and the reverse rotation shaft, and is configured to receive an operating force through the forward interlocked link or the reverse interlocked link. The accelerator interlocked wire connects the accelerator interlocked link to the accelerator operation tool.

In this manner, the interlocked mechanism is made mechanical. Thus, robustness can be enhanced, as compared to an electrical accelerator interlocked mechanism.

The work vehicle preferably has the following configuration. Specifically, the work vehicle includes a PTO clutch (power-take off clutch), a PTO clutch switch, and a switch operation link. The PTO clutch that performs transmission of engine power to a work machine in one state and performs shut-off of transmission of the engine power from the work machine in another state. The PTO clutch switch switches the PTO clutch between the transmission and the shut-off. The switch operation link rotates when receiving an operating force through the reverse rotation shaft to operate the PTO clutch switch such that the PTO clutch performs the shut-off.

In this manner, an operation of the work machine can be automatically stopped in reverse travel.

The work vehicle preferably has the following configuration. Specifically, the transmission mechanism includes a transmission mechanism that transmits an operating force applied to the reverse pedal to the transmission device and that has a backlash in coupling. When the reverse pedal is rotated from a neutral position to the direction away from the operator, the PTO clutch is caused to perform the shut-off by the switch operation link, and then, the operating force applied to the reverse pedal is transmitted to the transmission device.

In this manner, operation of the work machine can be automatically stopped before reverse travel starts.

The work vehicle preferably has the following configuration. Specifically, the work vehicle includes a cruise control operation tool, a fixed engagement portion, a movable engagement portion, and a brake pedal. The cruise control operation tool enables the operator to perform an operation of fixing a gear-shift state of the transmission device. The fixed engagement portion is connected to the forward rotation shaft and is configured to rotate integrally with the forward rotation shaft. The movable engagement portion is supported on the base portion. The movable engagement portion is configured to move with an operation on the cruise control operation tool to be engaged with the fixed engagement portion, thereby fixing the forward rotation shaft. The movable engagement portion moves away from the fixed engagement portion with an operating force that rotates the brake pedal in the direction away from the operator.

Accordingly, since structures for cruise control are also supported on the base portion, mechanisms concerning the pedals can be concentrated.

The work vehicle preferably has the following configuration. Specifically, the work vehicle includes a brake transmission link and a brake interlocked portion. The brake transmission link transmits an operating force applied to the brake pedal. The brake interlocked portion is connected to a rotation shaft of the cruise control operation tool. When the brake transmission link presses the brake interlocked portion, the cruise control operation tool rotates and causes the movable engagement portion to move away from the fixed engagement portion.

In this manner, cruise control can be canceled with a mechanical configuration.

DESCRIPTION OF EMBODIMENT

Figure 1:
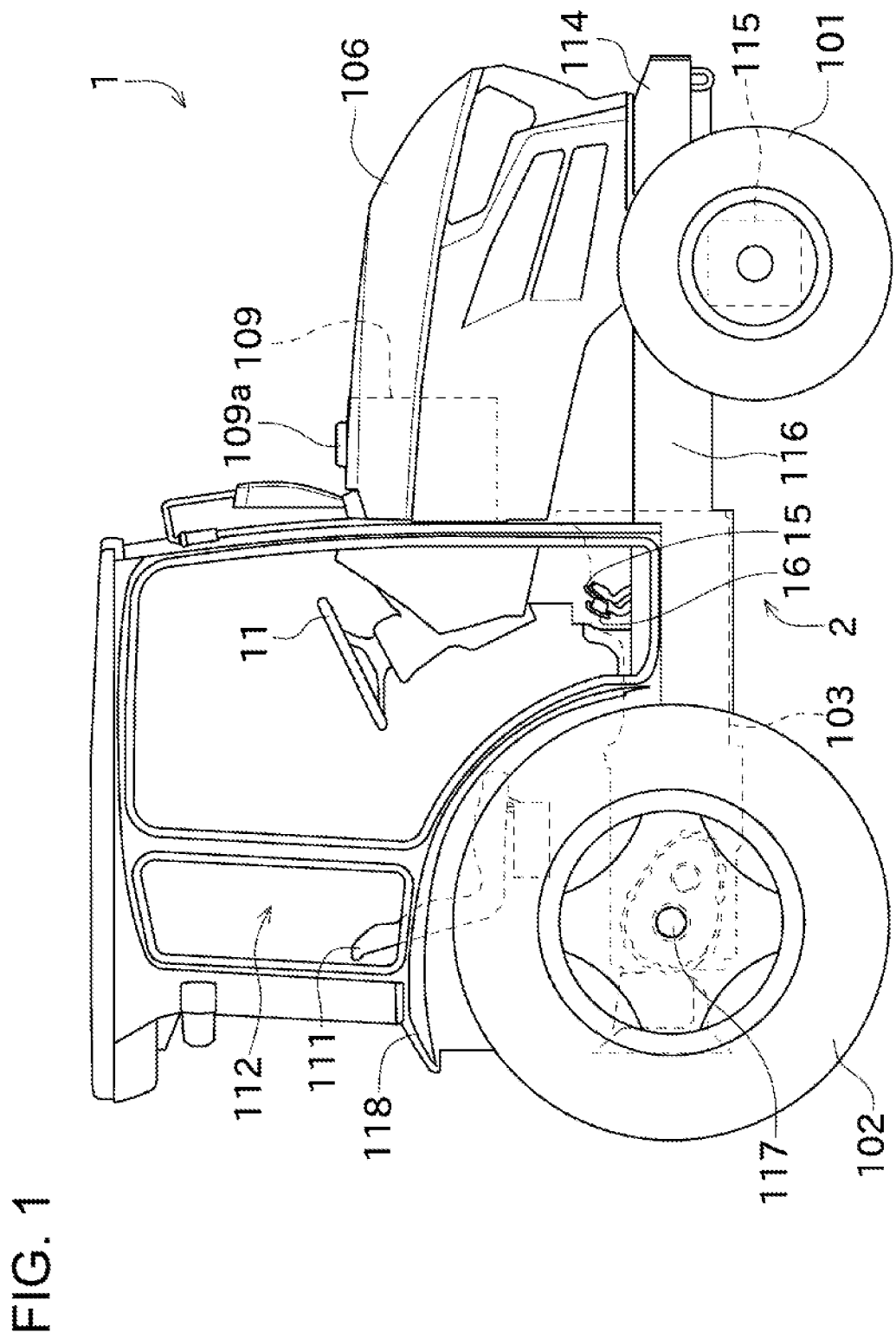
FIG. 1 A left side view illustrating an overall configuration of a tractor according to one embodiment of the present invention.
Figure 2:
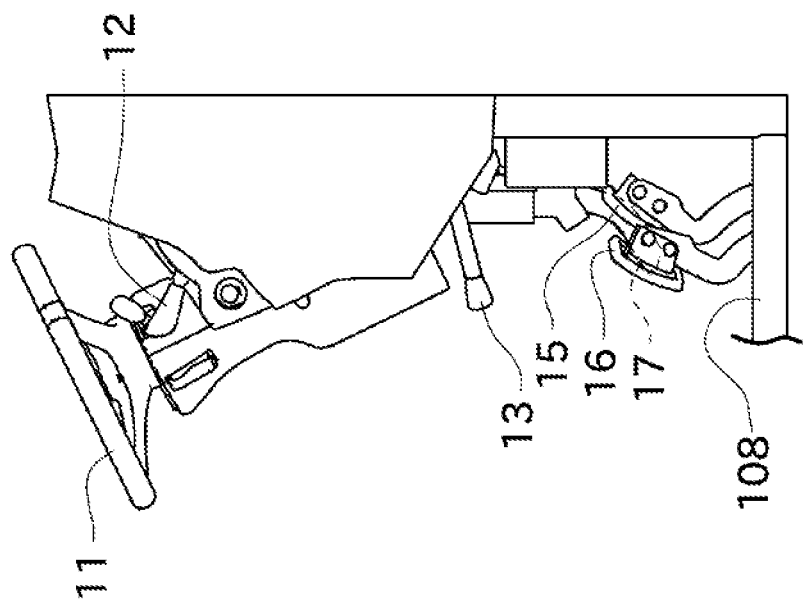
FIG. 2 A side view illustrating an operation tool disposed in a cabin.
Figure 3:
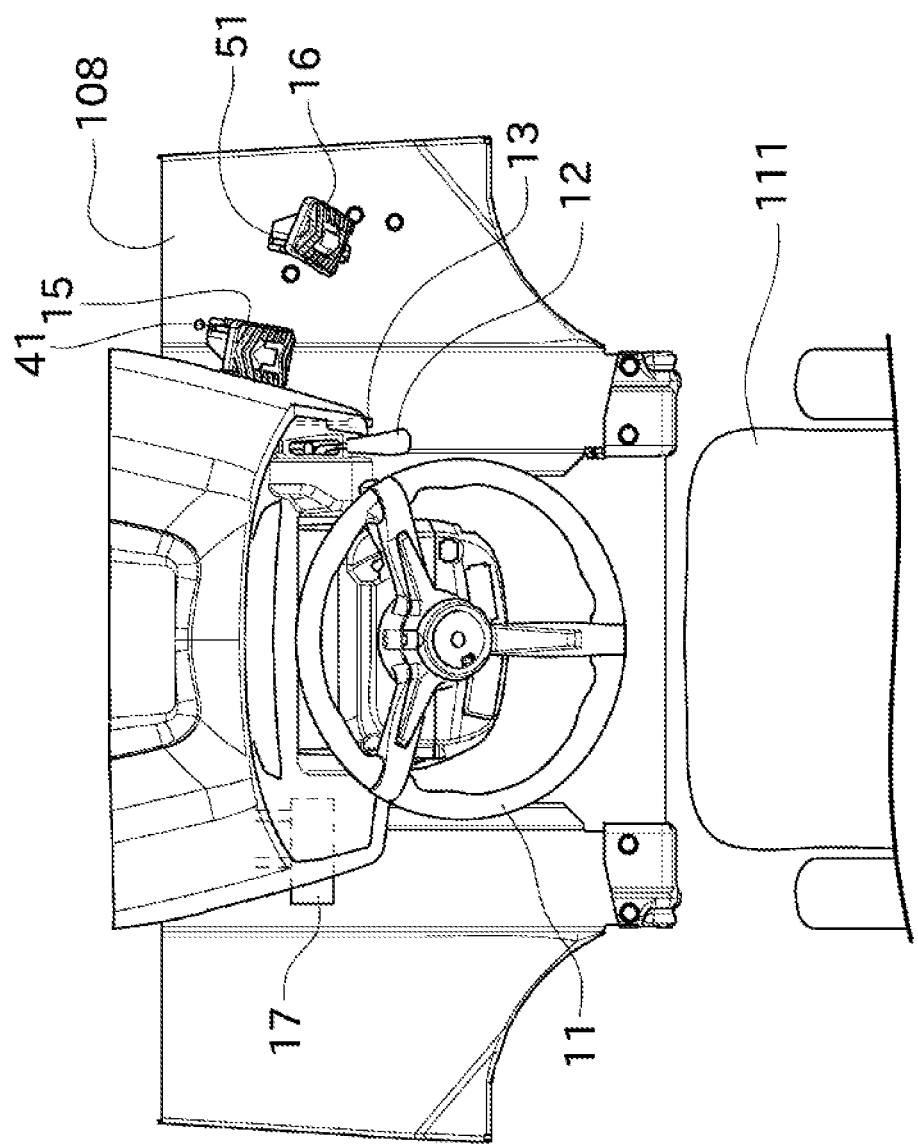
FIG. 3 A plan view illustrating the operation tool disposed in the cabin.

An embodiment of the present invention will now be described with reference to the drawings. FIG. 1 is a left side view illustrating an overall configuration of a tractor 1 according to one embodiment of the present invention. FIG. 2 is a side view illustrating an operation tool disposed in a cabin 112. FIG. 3 is a plan view illustrating the operation tool disposed in the cabin 112.

FIG. 1 shows the tractor 1 as a work vehicle according to the embodiment. A body 2 of the tractor 1 is supported on a pair of left and right front wheels 101, 101 and a pair of left and right rear wheels 102, 102, each of which wheel serves as a running wheel (traveling unit). Inside an engine hood 106 at the front part of a vehicle body 2, an engine 105 serving as a driving source is disposed.

On the top surface of the vehicle body 2, a cabin 112 is disposed behind the engine hood 106. Inside the cabin 112, a seat 111 on which an operator is seated is disposed. The cabin 112 includes therein a floor 108 on which feet of the operator seated on the seat 111 are placed. As illustrated in FIG. 2, a steering wheel 11, an accelerator operation tool 12, a cruise control operation tool 13, a forward pedal 15, a reverse pedal 16, and a brake pedal 17 are arranged around the seat 111. As illustrated in FIG. 3, the forward pedal 15 and the reverse pedal 16 are disposed at the right (at a side) of the steering wheel 11. The reverse pedal 16 is disposed at the right of (laterally outside) the forward pedal 15. The brake pedal 17 is disposed at the left (at the other side) of the steering wheel 11. The accelerator operation tool 12 and the cruise control operation tool 13 are disposed at the right of the steering wheel 11. As other operation tools, a traveling shift lever, a clutch pedal, and a PTO shift lever, for example, are disposed around the seat 111.

A fuel tank 109 for supplying fuel to the engine 105 is disposed ahead of the cabin 112. The fuel tank 109 is housed in the engine hood 106. A fuel supply port 109a of the fuel tank 109 is exposed through a through hole formed in the engine hood 106. The fuel tank 109 is supplied with fuel from the fuel supply port 109a.

A frame constituting the structure of the vehicle body 2 includes an unillustrated engine frame having a front bumper 114 and a front axle case 115, and left and right body frames 116, 116 detachably fixed to a rear portion of the engine frame. A transmission case 103 is coupled to rear portions of the vehicle body frames 116. The transmission case 103 has therein a mechanism for suitably converting power from the engine 105 and transmitting the power to the front and rear four wheels. The rear wheels 102 are attached to the transmission case 103 via a rear axle 117. The left and right wheels 102 is covered with right and left rear fenders 118 from above.

An unillustrated clutch housing is disposed behind the engine 105, and the transmission case 103 described above is disposed behind the clutch housing. In this manner, power from the engine 105 can be transmitted to and drive the rear wheels 102 while changing the speed.

The power of the engine 105 is transmitted to a first PTO shaft 131 projecting further rearward from the rear end of the transmission case 103 and to a second PTO shaft 132 projecting forward from the lower end of the transmission case 103 (see, for example, FIG. 2). The tractor 1 includes a work machine mounting device, and is structured so that an unillustrated work machine can be attached to the first PTO shaft 131 or the second PTO shaft 132 of the tractor 1.

Figure 4:
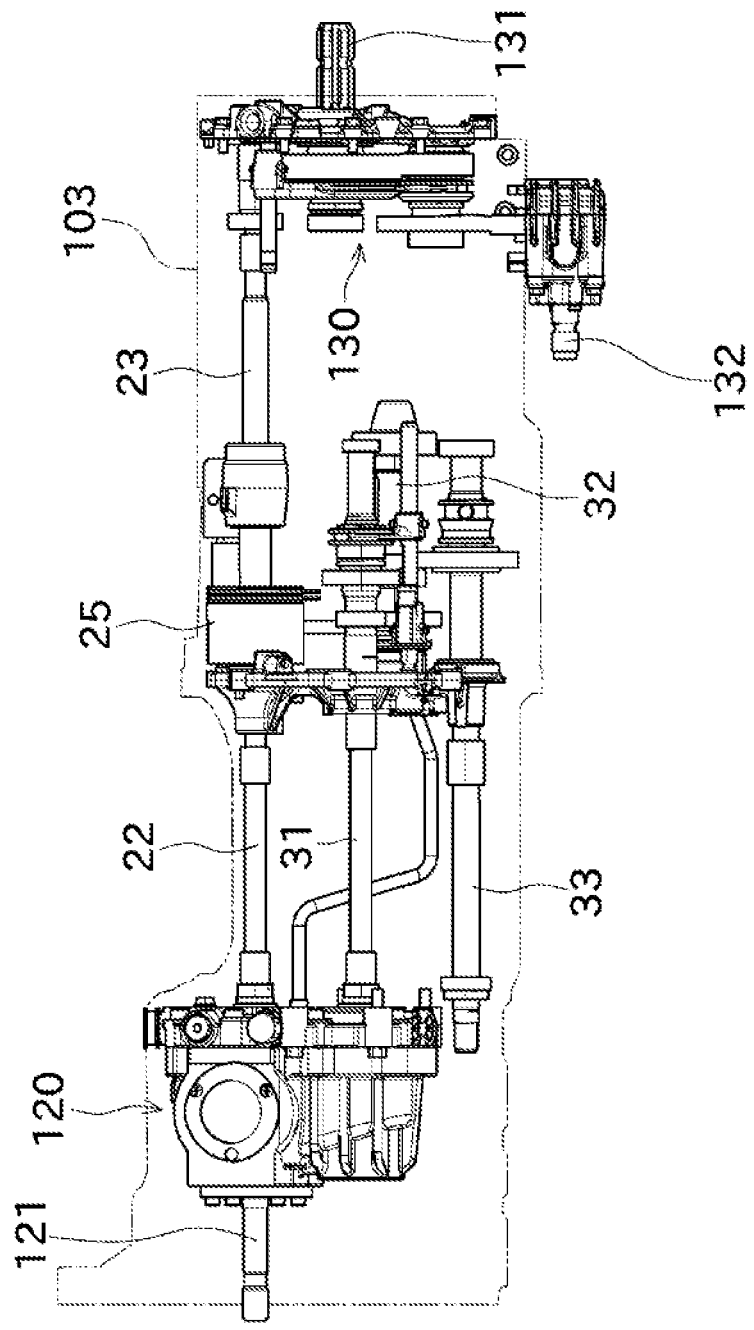
FIG. 4 A right side view illustrating a configuration inside a transmission case provided in the tractor.
Figure 5:
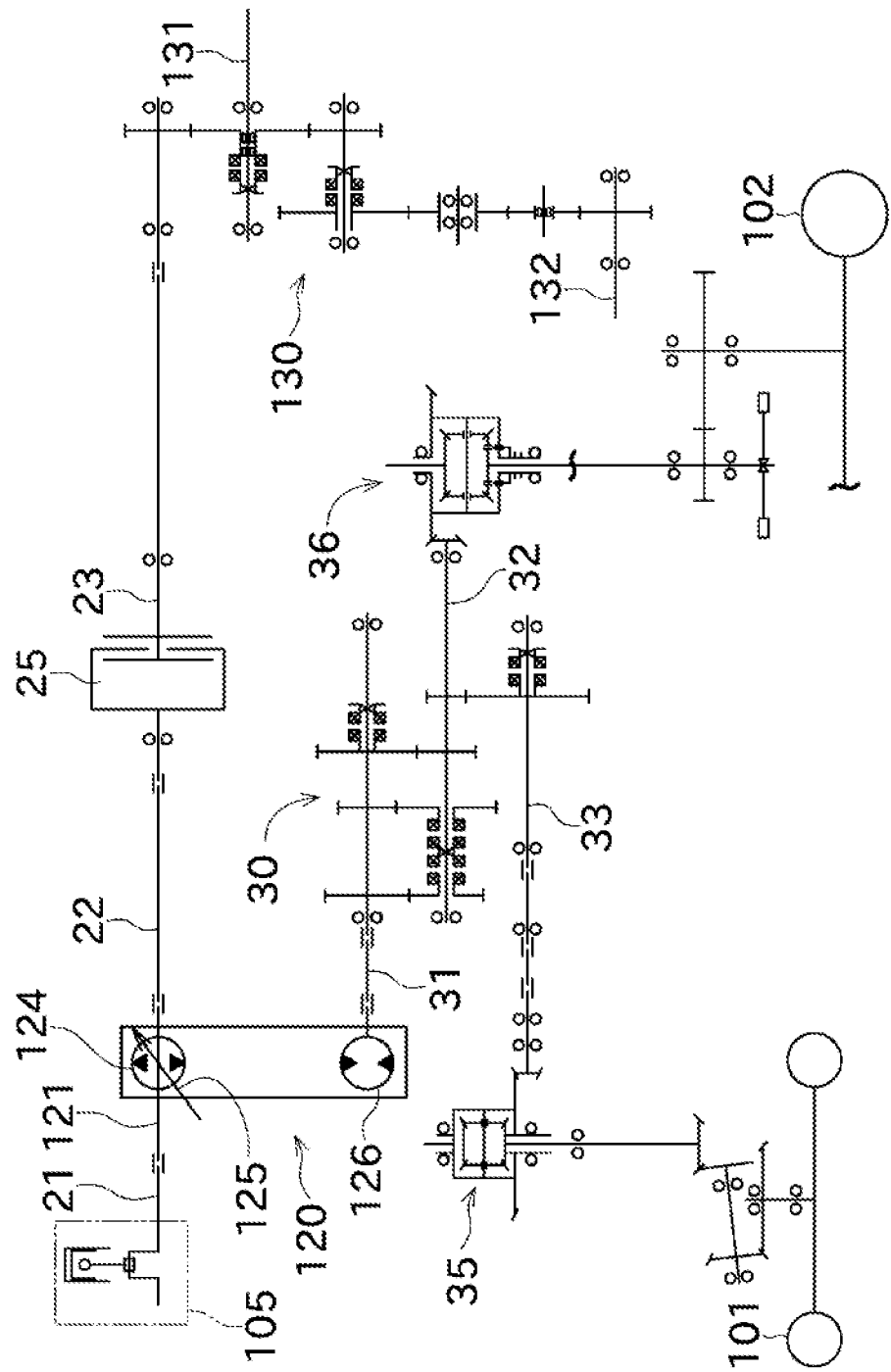
FIG. 5 A power transmission diagram of the tractor.

As illustrated in FIG. 4, the transmission case 103 houses a hydro-static transmission (HST) 120 that suitably changes the power transmitted from the engine 105. The power of the engine 105 is transmitted to a main transmission input shaft 121 of the transmission case 103 through an engine output shaft 21 illustrated in FIG. 5, is suitably changed in speed by the hydro-static transmission 120 and a traveling transmission mechanism, and is transmitted to the front wheels 101 and the rear wheels 102.

The hydro-static transmission 120 includes a hydraulic pump 124 and a hydraulic motor 126 connected to each other by a hydraulic pipe. The hydraulic pump 124 is driven by the main transmission input shaft 121. The hydraulic motor 126 drives a first sub-transmission shaft 31.

One of the hydraulic pump 124 and the hydraulic motor 126 of a fixed displacement type, and the other is of a variable displacement type. In this embodiment, the hydraulic motor 126 is of a fixed displacement type, and the hydraulic pump 124 is of a variable displacement so that the amount (discharge amount) of oil discharged from the hydraulic pump 124 is changeable. The hydraulic motor 126 may be of a variable displacement type with the hydraulic pump 124 being of a fixed displacement type.

The hydraulic pump 124 is provided with a movable swash plate 125 that changes the amount of discharge in accordance with a tilt angle. The tilt angle of the movable swash plate 125 changes by gear-shift operation of the operator. In this manner, the rotation speed of the first sub-transmission shaft 31 can be changed. When the operator presses the forward pedal 15, the first sub-transmission shaft 31 thereby rotates in a forward-traveling direction. When the operator presses the reverse pedal 16, the first sub-transmission shaft 31 rotates in a reverse-traveling direction.

The main transmission input shaft 121 is oriented to have its axis extending in a front-rear direction (longitudinal direction). The engine output shaft 21 of the engine 105 is disposed at the front end of the main transmission input shaft 121. The main transmission input shaft 121 rotates by power of the engine output shaft 21. A first main transmission shaft 22 is coupled to the rear end of the main transmission input shaft 121. The first main transmission shaft 22 is configured to rotate integrally with the engine output shaft 21 and the main transmission input shaft 121. The first sub-transmission shaft 31 disposed in parallel with the first main transmission shaft 22 is connected to the hydro-static transmission 120.

In the transmission case 103, the first main transmission shaft 22, the first sub-transmission shaft 31, and a front wheel transmission shaft 33 are arranged in parallel to one another in the hydro-static transmission 120. The first sub-transmission shaft 31 is disposed to protrude rearward from the hydraulic motor 126, and rotation continuously varied by the hydro-static transmission 120 is output to the first sub-transmission shaft 31.

A PTO clutch 25 for switching power to the first PTO shaft 131 or the second PTO shaft 132 between transmission and shut-off is disposed behind the first main transmission shaft 22. The power of the engine 105 transmitted to the first main transmission shaft 22 is transmitted to a second main transmission shaft 23 through the PTO clutch 25. The power of the engine 105 transmitted to the second main transmission shaft 23 is output to the first PTO shaft 131 or the second PTO shaft 132 through a PTO gear group 130 disposed behind the second main transmission shaft 23. This configuration enables power to be transmitted to and drive the work machine mounted on the tractor 1.

A sub transmission device 30 is disposed behind the first sub-transmission shaft 31. The sub-transmission device 30 shifts the speed of rotation of the first sub-transmission shaft 31, and transmits the shifted rotation to the second sub-transmission shaft 32 disposed in parallel with the first sub-transmission shaft 31. Rotation of the second sub-transmission shaft 32 is input to a rear wheel differential device 36 disposed in a rear portion of the transmission case 103, and drives the rear wheels 102 by way of an axle in a rear axle case, a transmission gear, and so forth.

The rotation of the second sub-transmission shaft 32 is transmitted to the front wheel transmission shaft 33 disposed in parallel with the second sub-transmission shaft 32. Rotation of the front wheel transmission shaft 33 is input to a front wheel differential device 35, and drives the front wheels 101 by way of an axle in the front axle case 115, transmission gears, and so forth.

Figure 6:
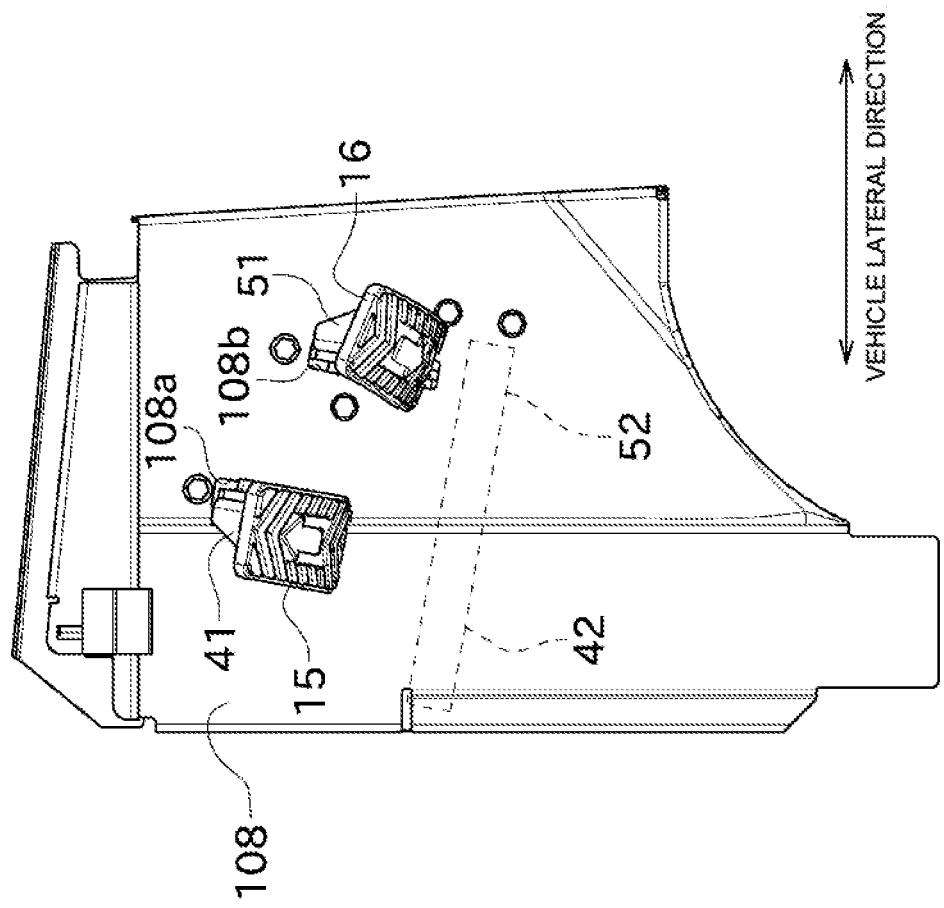
FIG. 6 A plan view illustrating a state where a pedal mechanism is attached to a floor.
Figure 7:
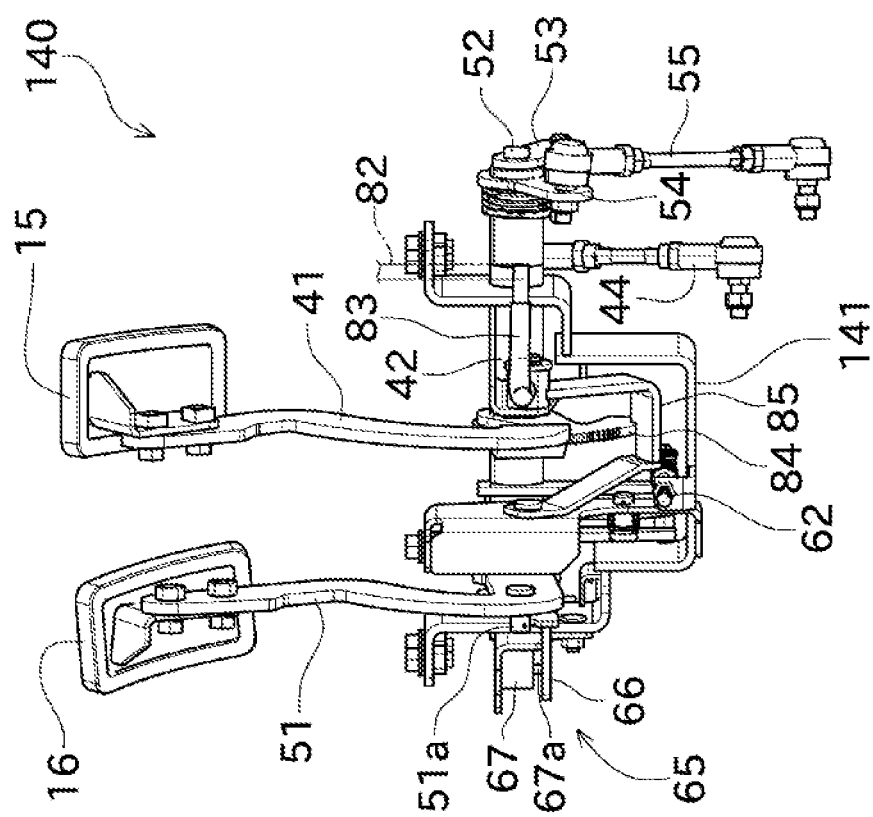
FIG. 7 A rear view of the pedal mechanism.
Figure 8:
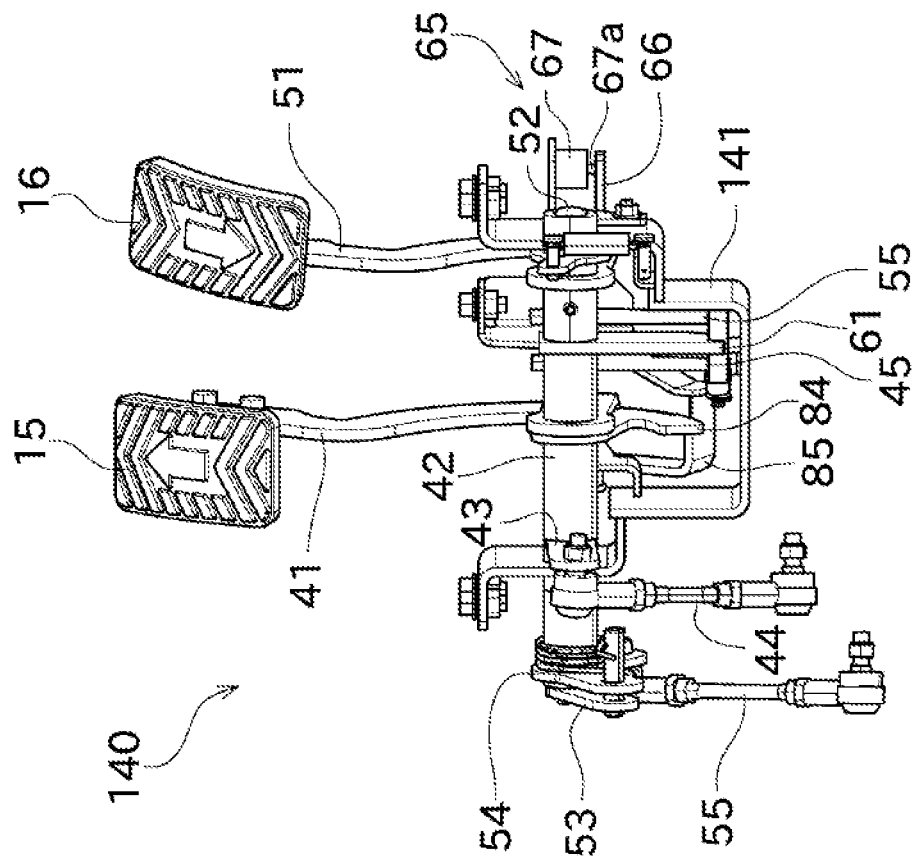
FIG. 8 A front view of the pedal mechanism.
Figure 9:
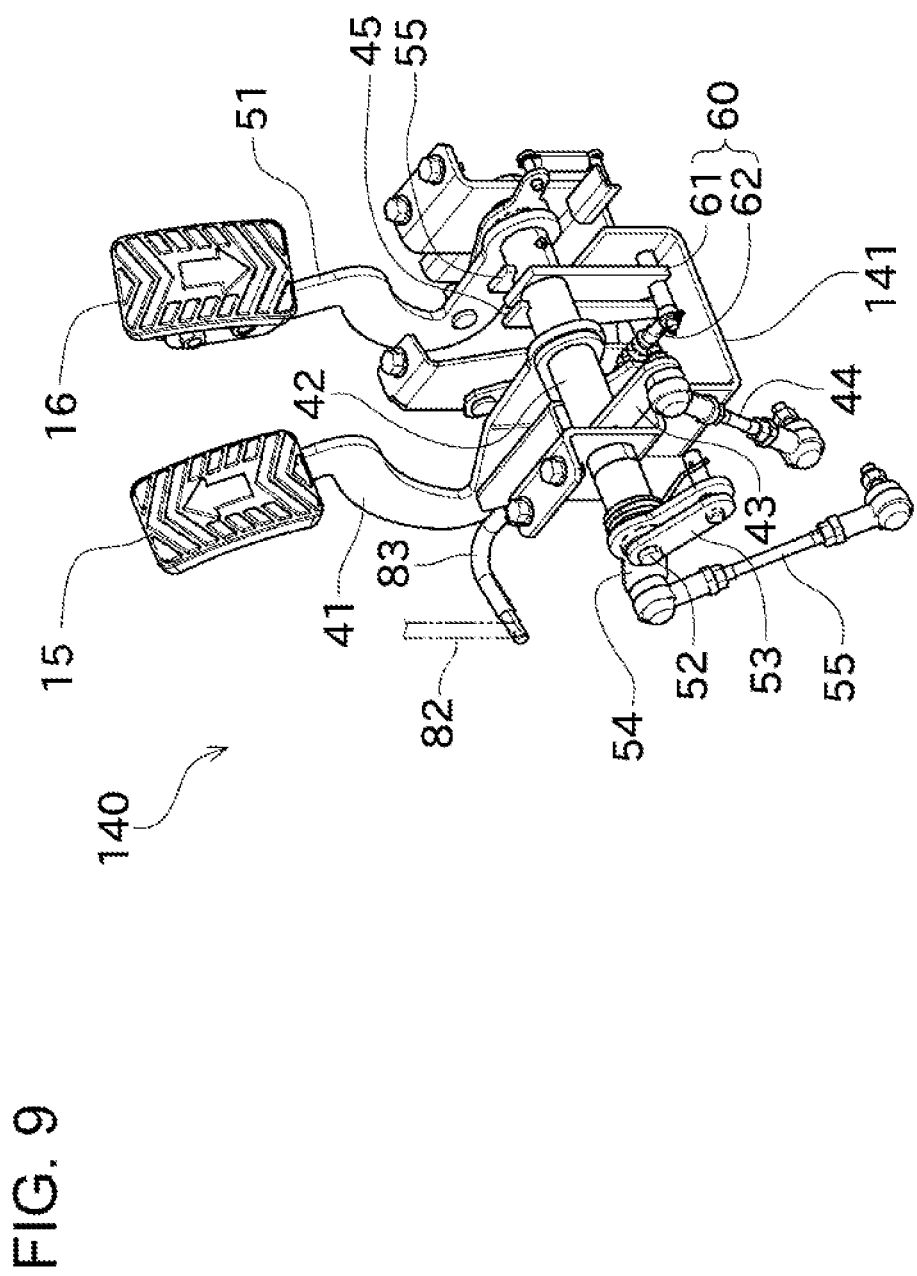
FIG. 9 A perspective view illustrating the pedal mechanism when seen from the rear and above.
Figure 10:
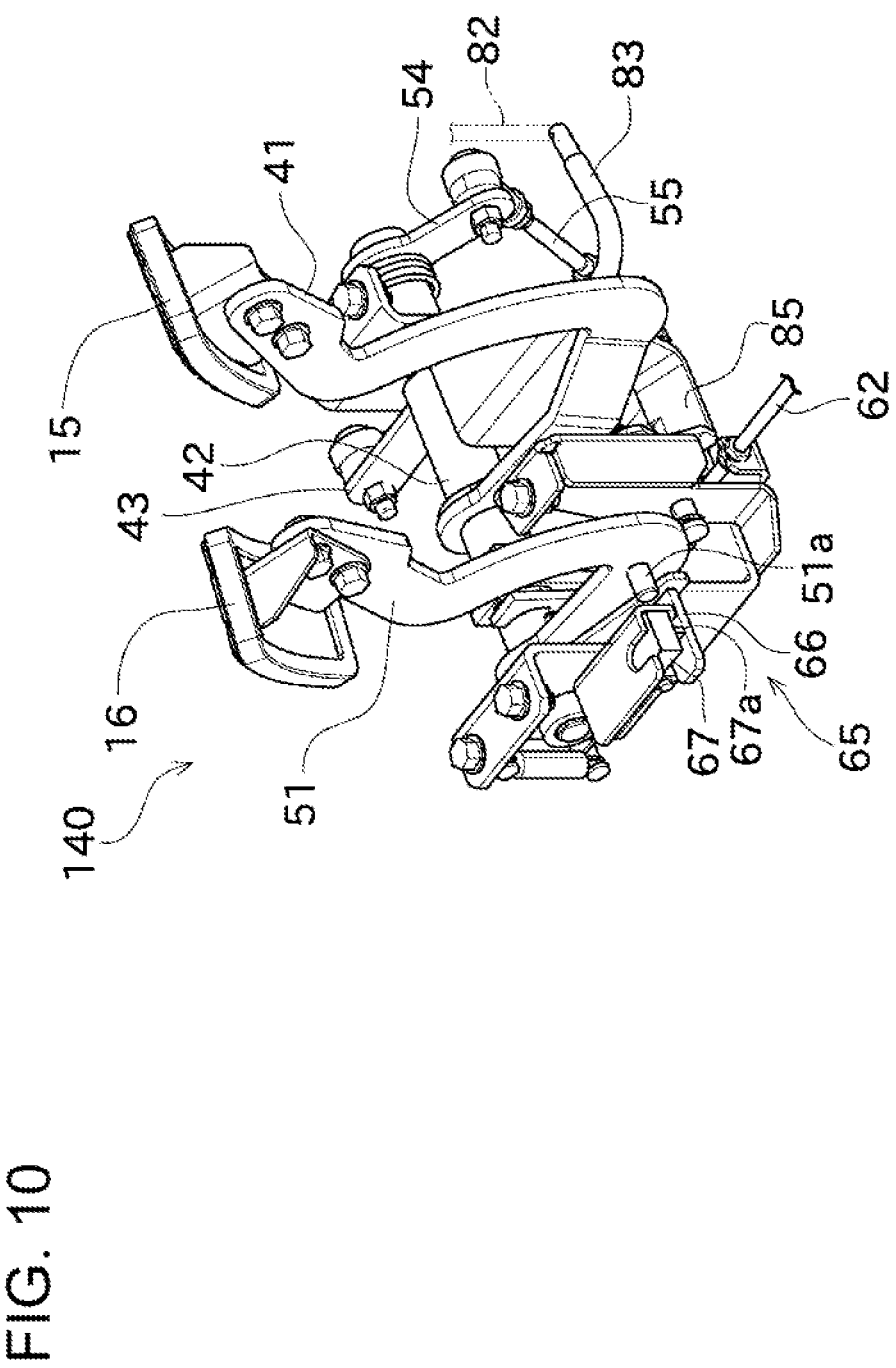
FIG. 10 A perspective view of the pedal mechanism when seen from the front and above.

A pedal mechanism 140 will now be described with reference to FIGS. 6 through 10. FIG. 6 is a plan view illustrating a state where the pedal mechanism 140 is attached to the floor 108. FIG. 7 is a rear view of the pedal mechanism 140. FIG. 8 is a front view of the pedal mechanism 140. FIG. 9 is a perspective view of the pedal mechanism 140 when seen from the rear and above. FIG. 10 is a perspective view of the pedal mechanism 140 when seen from the rear and above.

The pedal mechanism 140 is a mechanism that transmits an operating force applied by operator's pressing of the forward pedal 15 and the reverse pedal 16 in the direction away from the operator (forward and downward), to the hydro-static transmission 120 through an operating force transmission mechanism 90 described later. The forward pedal 15 and the reverse pedal 16 are disposed at the right of the steering wheel 11, and thus, the pedal mechanism 140 is also disposed at the right of the center of the vehicle body 2.

Each part of the pedal mechanism 140 is supported on a base portion 141. The base portion 141 has two portions extending upward, and is attached to the floor 108 in these portions.

The pedal mechanism 140 include a forward pedal arm 41, a forward rotation shaft 42, a forward transmission link 43, and a forward transmission arm 44, as members for causing the tractor 1 to travel forward. These members are supported on the base portion 141.

The forward pedal arm 41 is a substantially L-shaped member, and is disposed to penetrate a first insertion hole 108a formed in the floor 108. The forward pedal 15 is attached to one end (upper end: first end) of the forward pedal arm 41. The other end (second end) of the forward pedal arm 41 is fixed to the forward rotation shaft 42.

The forward rotation shaft 42 is configured to rotate integrally with the forward pedal arm 41. In this embodiment, as illustrated in FIG. 6, the axial direction of the forward rotation shaft 42 is oriented to tilt relative to the lateral direction of the vehicle body 2. Specifically, the forward rotation shaft 42 is oriented to tilt toward the rear of the vehicle body 2 as approaching a laterally outside of the vehicle body 2 (i.e., one side in the lateral direction; the right in a case where the forward pedal 15 is disposed at the right of the center).

The forward transmission link 43 is fixed to the forward rotation shaft 42, and is configured to rotate integrally with the forward rotation shaft 42. The forward transmission arm 44 is rotatably coupled to the front end of the forward transmission link 43. An operating force transmitted to the forward transmission arm 44 is transmitted to the hydro-static transmission 120 through the operating force transmission mechanism 90.

Figure 11:
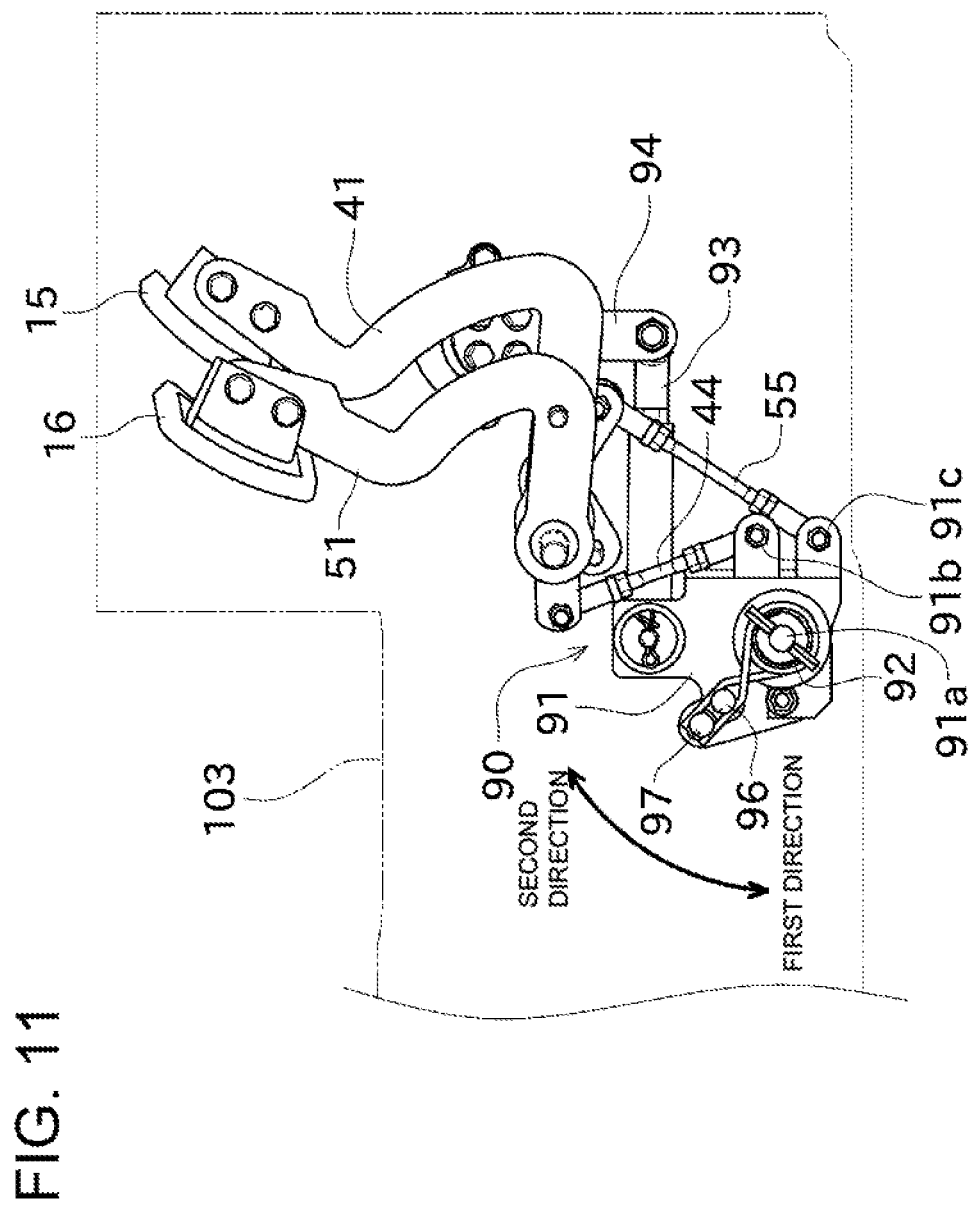
FIG. 11 A view illustrating a pedal mechanism and an operating force transmission mechanism while the forward pedal and the reverse pedal are not operated.

With reference to FIG. 11, the operating force transmission mechanism 90 will be described. FIG. 11 is a view illustrating the pedal mechanism 140 and the operating force transmission mechanism 90 while the forward pedal 15 and the reverse pedal 16 are not operated. FIG. 11 does not show some members of the pedal mechanism 140. As illustrated in FIG. 11, the operating force transmission mechanism 90 includes a coupling link 91, a biasing member 92, a trunnion operation link 93, and a trunnion arm 94.

The coupling link 91 is configured to be rotatable about a rotation shaft 91a. The coupling link 91 has a forward transmission arm coupling hole 91b and a reverse transmission arm coupling hole 91c. The other end (second end) of the forward transmission arm 44 described above is rotatably coupled to the forward transmission arm coupling hole 91b. Accordingly, an operating force of the forward pedal 15 is transmitted to cause the coupling link 91 to rotate in a first direction illustrated in FIG. 11.

The biasing member 92 is attached to the rotation shaft 91a of the coupling link 91. The biasing member 92 is wound across both ends of a first pin member 96 that rotates integrally with the coupling link 91 and across both ends of a second pin member 97 that does not rotate upon rotation of the coupling link 91. With this configuration, even when the coupling link 91 rotates in any of the first direction and a second direction, the biasing member 92 biases the coupling link 91 to a direction in which the rotation is returned to the original direction (specifically, the second direction in the case of rotation in the first direction and the first direction in the case of rotation in the second direction). Thus, when the operating force is not applied to the forward pedal 15 anymore, rotation of the forward pedal 15 can be returned to the original direction. The trunnion operation link 93 is rotatably coupled to the coupling link 91.

The trunnion operation link 93 couples the coupling link 91 and the trunnion arm 94 to each other. Accordingly, rotation of the coupling link 91 enables the trunnion arm 94 to rotate. The rotation of the trunnion arm 94 changes a tilt angle of a movable swash plate 125 so that speed shift can be performed and/or the rotation direction of the first sub-transmission shaft 31 (i.e., the rotation direction of the axle) can be switched.

The pedal mechanism 140 includes a reverse pedal arm 51, a reverse rotation shaft 52, a reverse transmission link 53, a freely fitting link 54, and a reverse transmission arm 55, as members for causing the tractor 1 to travel in reverse. These members are supported on the base portion 141.

The reverse pedal arm 51 is a substantially L-shaped member, and is disposed to penetrate a second insertion hole 108b formed in the floor 108. The reverse pedal 16 is attached to one end (upper end: first end) of the reverse pedal arm 51. The other end (second end) of the reverse pedal arm 51 is fixed to the reverse rotation shaft 52.

The reverse rotation shaft 52 is configured to rotate integrally with the reverse pedal arm 51. The reverse rotation shaft 52 passes through the inside of the forward rotation shaft 42. Thus, the forward rotation shaft 42 and the reverse rotation shaft 52 have a common center position (i.e., are coaxial). The reverse rotation shaft 52 is configured to be rotatable independently of the forward rotation shaft 42.

The forward pedal 15 and the reverse pedal 16 are disposed at the right of the seat 111. Thus, the operator operates (presses) the forward pedal 15 and the reverse pedal 16 with his or her legs open. In addition, in this embodiment, the forward rotation shaft 42 and the reverse rotation shaft 52 are oriented to tilt in the lateral direction of the vehicle body 2 (specifically, approach the rear toward the right (i.e., laterally outside of the vehicle body 2)). Accordingly, the direction in which the operator applies a force coincides with the rotation direction of the forward pedal 15 (and the reverse pedal 16), and thus, operability can be enhanced. Furthermore, in this embodiment, to further enhance operability, the forward pedal 15 and the reverse pedal 16 are disposed in such a manner that the orientations of the forward pedal 15 and the reverse pedal 16 are close to the orientations of the feet (legs) of the operator. Thus, in a front view (see, for example, FIG. 6), the reverse pedal 16 located outside the forward pedal 15 has a larger tilt angle (an angle formed by the longitudinal direction of the pedal and the longitudinal direction of the vehicle body) than that of the forward pedal 15.

The reverse transmission link 53 is connected to the reverse rotation shaft 52, and is configured to rotate integrally with the reverse rotation shaft 52. The freely fitting link 54 is coupled to the front end of the reverse transmission link 53.

The freely fitting link 54 is a substantially L-shaped member, and is disposed in such a manner that a portion where two sides of the L shape overlap coincide with the rotation center of the reverse rotation shaft 52. The reverse transmission link 53 is coupled to a front end of one side of the L shape of the freely fitting link 54. The freely fitting link 54 rotates when receiving a force from the reverse transmission link 53. The reverse transmission link 53 and the freely fitting link 54 are coupled to each other by a pin. The freely fitting link 54 has a pin insertion hole that is slightly larger than the pin (in such a manner that the reverse transmission link 53 and the freely fitting link 54 are coupled to each other with a backlash (margin)). For example, the pin insertion hole may be a circle whose diameter is larger than that of the pin, or may be a long hole. This configuration can reduce or prevent transfer of power to the freely fitting link 54 until the angle reaches a predetermined angle even when the reverse pedal 16 rotates from a neutral position to the direction away from the operator.

The reverse transmission arm 55 is rotatably coupled to the other side of the L shape of the freely fitting link 54. One end of the reverse transmission arm 55 is coupled to the freely fitting link 54, and the other end of the reverse transmission arm 55 is coupled to the forward transmission arm coupling hole 91b of the coupling link 91. An operating force transmitted to the reverse transmission arm 55 is transmitted to the trunnion arm 94 through the coupling link 91 and the trunnion operation link 93, in a manner similar to forward traveling.

The forward transmission arm 44 is coupled to the forward transmission link 43 behind the forward rotation shaft 42. Thus, when the forward pedal 15 is operated, the forward transmission arm 44 moves upward. Accordingly, when the coupling link 91 rotates in the first direction, the trunnion arm 94 thereby rotates forward.

On the other hand, the reverse transmission arm 55 is coupled to the freely fitting link 54 ahead of the reverse rotation shaft 52. Thus, when the reverse pedal 16 is operated, the reverse transmission arm 55 moves downward. Accordingly, when the coupling link 91 rotates in the second direction, the trunnion arm 94 thereby rotates rearward.

Each of the forward pedal 15 and the reverse pedal 16 is configured to rotate while being interlocked with the coupling link 91. Thus, an operating force that rotates the forward pedal 15 in the direction away from the operator is transmitted to the reverse pedal 16 through the coupling link 91. Accordingly, the reverse pedal 16 rotates toward the operator. Similarly, when the operating force that rotates the reverse pedal 16 in the direction away from the operator is transmitted to the forward pedal 15 through the coupling link 91, the forward pedal 15 rotates toward the operator.

Figure 12:
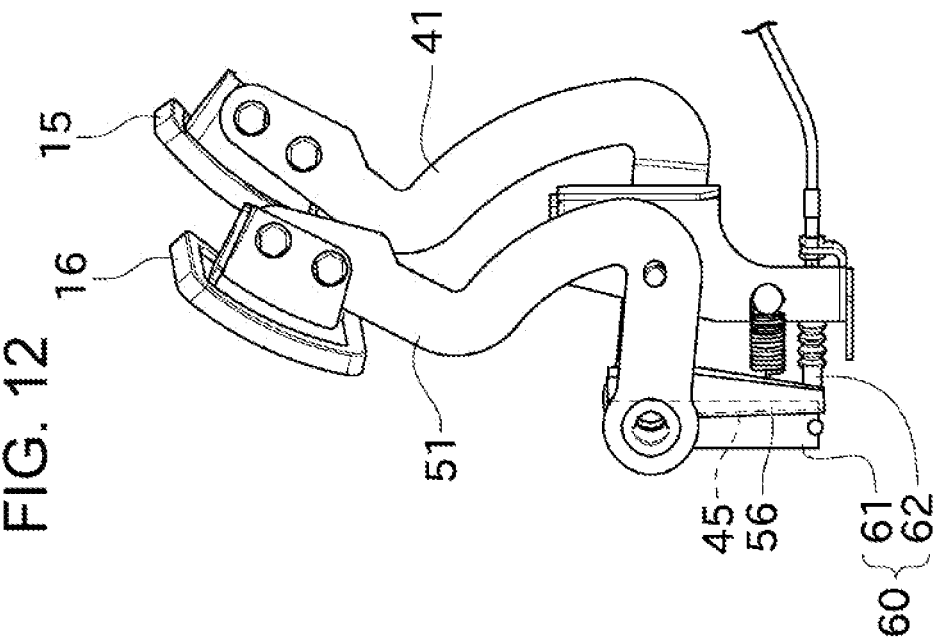
FIG. 12 A view illustrating the pedal mechanism and an accelerator interlocked mechanism while the forward pedal and the reverse pedal are not operated.

Next, a configuration that increases an engine speed while interlocking with operation of the forward pedal 15 and the reverse pedal 16 will be described with reference to FIG. 12. FIG. 12 is a view illustrating the pedal mechanism 140 and an accelerator interlocked mechanism 60 while the forward pedal 15 and the reverse pedal 16 are not operated. FIG. 12 does not show some members of the pedal mechanism 140.

As illustrated in FIGS. 8, 9, and 12, for example, a forward interlocked link 45 that rotates integrally with the forward rotation shaft 42 is connected to the forward rotation shaft 42. A reverse interlocked link 56 that rotates integrally with the reverse rotation shaft 52 is connected to the reverse rotation shaft 52.

The pedal mechanism 140 includes the accelerator interlocked mechanism 60. The accelerator interlocked mechanism 60 is constituted by an accelerator interlocked link 61 and an accelerator interlocked wire 62. The accelerator interlocked mechanism 60 is supported on a base portion 141.

The accelerator interlocked link 61 is disposed between the forward interlocked link 45 and the reverse interlocked link 56. The accelerator interlocked link 61 can rotate independently of each of the forward rotation shaft 42 and the reverse rotation shaft 52. The accelerator interlocked link 61 is biased by a tension spring toward the forward interlocked link 45 and the reverse interlocked link 56 (forward).

One end of the accelerator interlocked wire 62 is connected to the accelerator interlocked link 61. The other end of the accelerator interlocked wire 62 is connected to the accelerator operation tool 12. By pulling the accelerator interlocked wire 62 rearward (to the side opposite to the forward interlocked link 45 and the reverse interlocked link 56), the accelerator operation tool 12 rotates in a direction in which the engine speed increases. A rotation angle of the accelerator operation tool 12 is detected by, for example, a potentiometer, and in response to the detection result, the engine 105 is controlled.

In a case where the operator operates the forward pedal 15, the forward interlocked link 45 rotates clockwise in FIG. 12. Accordingly, the accelerator interlocked link 61 receives a force from the forward interlocked link 45 and rotates in the same direction. Consequently, the accelerator interlocked wire 62 is pulled, and thereby, the engine speed increases.

In a case where the operator operates the reverse pedal 16, the reverse interlocked link 56 rotates clockwise in FIG. 12. Accordingly, the accelerator interlocked link 61 receives a force from the reverse interlocked link 56 and rotates in the same direction. Consequently, the accelerator interlocked wire 62 is pulled, and thereby, the engine speed increases.

With the foregoing configuration, the engine speed can be increased by operation of any one of the forward pedal 15 and the reverse pedal 16.

Figure 13:
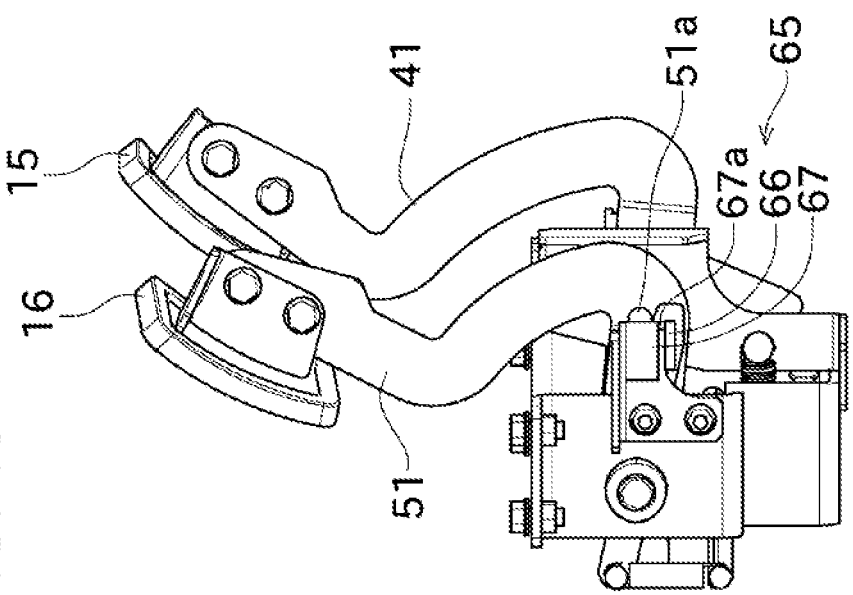
FIG. 13 A view illustrating the pedal mechanism and a PTO switch interlocked mechanism while the reverse pedal is not operated.

A configuration that automatically stops operation of the work machine in accordance with operation of the reverse pedal 16 will now be described with reference to FIG. 13. FIG. 13 is a view illustrating the pedal mechanism 140 and a PTO switch interlocked mechanism 65 while the reverse pedal 16 is not operated. FIG. 13 does not show some members of the pedal mechanism 140.

As illustrated in FIGS. 7, 8, 10, and 13, for example, the pedal mechanism 140 includes the PTO switch interlocked mechanism 65. The PTO switch interlocked mechanism 65 is constituted by a switch operation link 66 and a PTO clutch switch 67. The switch operation link 66 and the PTO clutch switch 67 are supported on the base portion 141.

The switch operation link 66 is a member that has the same rotation axis as that of the reverse rotation shaft 52 and is rotatable independently of each of the forward rotation shaft 42 and the reverse rotation shaft 52. The switch operation link 66 is biased by a tension spring in the direction opposite to the operation direction of the reverse pedal arm 51 (i.e., counterclockwise in FIG. 13). The switch operation link 66 rotates when receiving a force from a projection portion 51a projecting from the reverse pedal arm 51 in the rotation shaft direction.

The PTO clutch switch 67 switches the PTO clutch 25 between a state where the PTO clutch 25 transmits power of the engine 105 to the work machine (transmission state) and a state where the PTO clutch 25 shuts off transmission of power of the engine 105 to the work machine (shut-off state). The PTO clutch switch 67 is provided with an operating element 67a. While the operating element 67a is pushed (upward), the PTO clutch switch 67 sets the PTO clutch 25 in the transmission state, whereas while the operating element 67a is not pushed (upward), the PTO clutch switch 67 sets the PTO clutch 25 in the shut-off state.

While the reverse pedal 16 is not operated, the operating element 67a is pushed by the switch operation link 66. Thus, the PTO clutch is in the transmission state, and the work machine can be operated.

When the reverse pedal 16 is operated, the switch operation link 66 is pushed by the projection portion 51a of the reverse pedal arm 51 and rotates clockwise. Accordingly, the switch operation link 66 moves away from the operating element 67a so that the PTO clutch 25 becomes the shut-off state. Consequently, the work machine stops operating.

As described above, even when the reverse pedal 16 is operated, a backslash of the freely fitting link 54 can prevent the tractor 1 from starting traveling in reverse immediately. Specifically, when the reverse pedal 16 is gradually pushed in the direction away from the operator (forward and downward), the PTO clutch 25 first becomes the shut-off state by the switch operation link 66, and then, an operating force applied to the reverse pedal 16 is transmitted to the hydrostatic transmission 120. Consequently, operation of the work machine can be stopped before reverse travel of the tractor 1 starts.

Since the forward pedal 15 does not operate while being interlocked with the switch operation link 66, operation on the forward pedal 15 is not interlocked with operation of the work machine.

Figure 14:
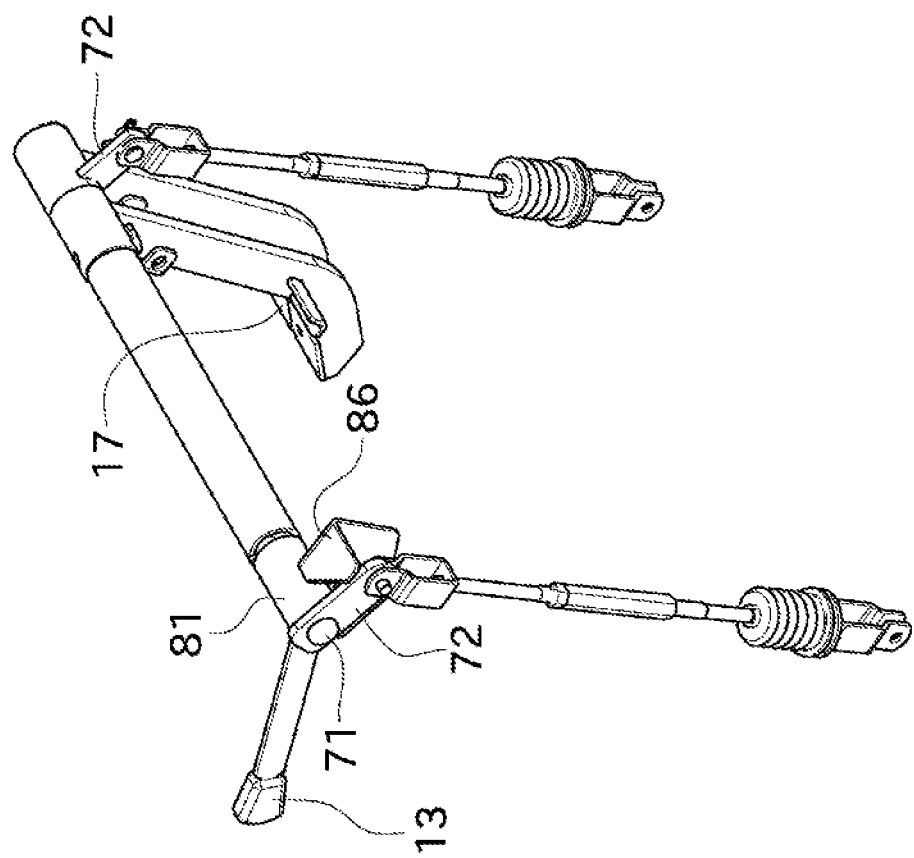
FIG. 14 A perspective view illustrating a configuration in which a brake pedal and a cruise control operation tool cooperate with each other.

Next, start and cancel of cruise control that maintains an operation amount of the forward pedal 15 will be described with reference to FIGS. 7, 8, and 14, for example. FIG. 14 is a perspective view illustrating a configuration in which the brake pedal 17 and the cruise control operation tool 13 are interlocked with each other.

As illustrated in FIG. 7, the pedal mechanism 140 includes a fixed engagement portion 84 and a movable engagement portion 85, as members for cruise control (control for uniform vehicle speed, the function of maintaining the speed). The fixed engagement portion 84 and the movable engagement portion 85 are supported on the base portion 141.

The fixed engagement portion 84 is connected (fixed) to the forward rotation shaft 42 so as to be rotatable integrally with the forward rotation shaft 42. A front end of the fixed engagement portion 84 has a large number of grooves.

The movable engagement portion 85 is configured to be rotatable independently of each of the forward rotation shaft 42 and the reverse rotation shaft 52. The movable engagement portion 85 is configured to rotate in a direction toward the fixed engagement portion 84 to be thereby engageable with the fixed engagement portion 84. The engagement of the movable engagement portion 85 with the fixed engagement portion 84 fixes the amount of rotation of the forward rotation shaft 42. Thus, the forward traveling speed can be kept uniform.

FIG. 14 illustrates the cruise control operation tool 13. The cruise control operation tool 13 is configured to be rotatable about a rotation shaft 81. A transmission cable 82 (see, for example, FIGS. 7 and 10) connected to the rotation shaft 81 can be moved downward by rotating the cruise control operation tool 13 upward.

Accordingly, the movable engagement portion 85 can be rotated toward the fixed engagement portion 84 by rotating a transmission member 83 connected to the transmission cable 82. By rotating the cruise control operation tool 13 downward, the transmission cable 82 can be moved upward so that the movable engagement portion 85 can be rotated in reverse. Thus, cruise control can be canceled.

In this embodiment, cruise control can also be canceled by operating the brake pedal 17. This will be specifically described. As illustrated in FIG. 14, the brake pedal 17 rotates about a brake rotation shaft 71 disposed above the brake pedal 17. A transmission link 72 is coupled to the brake rotation shaft 71. Brakes are engaged by rotation of the brake transmission link 72.

The brake rotation shaft 71 is coaxial with the rotation shaft 81. A brake interlocked portion 86 that rotates integrally with the rotation shaft 81 is connected to the rotation shaft 81. With this configuration, operation on the brake pedal 17 causes the brake rotation shaft 71 to rotate, and the brake transmission link 72 rotates upward accordingly. The brake interlocked portion 86 rotates upward when being pushed by the brake transmission link 72 that has rotated upward. Accordingly, the transmission cable 82 moves upward, and thereby, the movable engagement portion 85 can be rotated in the direction away from the fixed engagement portion 84. Thus, cruise control can be canceled.

As described above, the tractor 1 according to this embodiment includes the floor 108, the forward pedal arm 41, the reverse pedal arm 51, the forward rotation shaft 42, the reverse rotation shaft 52, the base portion 141, and the hydro-static transmission 120. The floor 108 is a member having the first insertion hole 108a and the second insertion hole 108b, and the feet of the operator is are placed on the floor 108. The forward pedal arm 41 is placed in the first insertion hole 108a and provided with the forward pedal 15. The reverse pedal arm 51 is placed in the second insertion hole 108b and provided with the reverse pedal 16. The forward rotation shaft 42 serves as a rotation shaft of the forward pedal arm 41, and is oriented to tilt toward the rear of the vehicle body 2 as approaching a laterally outside (the right) of the vehicle body 2. The rearward rotation shaft 52 serves as a rotation shaft of the reverse pedal arm 51, and is oriented to tilt toward the rear of the vehicle body 2 as approaching the laterally outside (the right) of the vehicle body 2. The base portion 141 supports the forward pedal arm 41, the reverse pedal arm 51, the forward rotation shaft 42, and the reverse rotation shaft 52, and is attached to the floor 108. The hydro-static transmission 120 performs gear shift in accordance with an operating force applied to each of the forward pedal 15 and the reverse pedal 16.

Since the rotation shafts of the forward pedal 15 and the reverse pedal 16 tilt as described above, the direction in which the operator applies a force coincides with the rotation direction of the pedals. Thus, operability can be enhanced. In addition, since all the pedal arms and the rotation shafts are supported on the base portion 141, mechanisms concerning the pedals can be concentrated. Thus, the members can be easily assembled to the vehicle body.

The tractor 1 according to the embodiment includes the coupling link 91 that rotates in the first direction when receiving an operating force that rotates the forward pedal 15 in the direction away from the operator and rotates in the second direction opposite to the first direction when receiving an operating force that rotates the reverse pedal 16 in the direction away from the operator. When the forward pedal 15 is rotated in the rotation away from the operator, the operating force that rotates the forward pedal 15 in the direction away from the operator is transmitted to the reverse pedal 16 through the coupling link 91 so that the reverse pedal 16 rotates toward the operator. When the reverse pedal 16 is rotated in the direction away from the operator, the operating force that rotates the reverse pedal 16 in the direction away from the operator is transmitted to the forward pedal 15 through the coupling link 91 so that the forward pedal 15 rotates toward the operator.

In this manner, when one of the forward pedal 15 and the reverse pedal 16 is rotated in the direction away from the operator, the other pedal can be rotated toward the operator. Thus, the state where power of the engine 105 is transmitted to the forward-traveling side and the state where power of the engine 105 is transmitted to the reverse-traveling side can be clearly distinguished from each other. Thus, the configuration can be simplified.

The tractor 1 according to the embodiment includes the biasing member 92 that biases the coupling link 91 in the second direction when the coupling link 91 rotates in the first direction, and biases the coupling link 91 in the first direction when the coupling link 91 rotates in the second direction.

Accordingly, structures for returning the forward pedal 15 and the reverse pedal 16 to neutral positions can be concentrated in the coupling link 91. Thus, the configuration can be simplified.

In the tractor 1 according to this embodiment, the forward rotation shaft 42 and the reverse rotation shaft 52 have the same shaft center position. The tractor 1 includes the forward interlocked link 45, the reverse interlocked link 56, and the accelerator interlocked mechanism 60. The forward interlocked link 45 rotates when receiving an operating force through the forward rotation shaft 42. The reverse interlocked link 56 rotate when receiving an operating force through the reverse rotation shaft 52. The accelerator interlocked mechanism 60 is supported on the base portion 141, and increases the engine speed when receiving an operating force through the forward interlocked link 45 or the reverse interlocked link 56.

In this manner, not only the hydro-static transmission 120 but also the engine speed can be controlled in an interlocked manner by operating any one of the forward pedal 15 and the reverse pedal 16. In addition, since the accelerator interlocked mechanisms is supported on the base portion 141, mechanisms concerning the pedals can be concentrated.

The tractor 1 according to this embodiment includes the accelerator operation tool 12 that enables the operator to perform an operation of increasing the engine speed. The accelerator interlocked mechanism 60 includes the accelerator interlocked link 61 and the accelerator interlocked wire 62. The accelerator interlocked link 61 is attached to be rotatable independently of each of the forward rotation shaft 42 and the reverse rotation shaft 52. The accelerator interlocked wire 62 connects the accelerator interlocked link 61 and the accelerator operation tool 12 to each other.

In this manner, the accelerator interlocked mechanism is made mechanical. Thus, robustness can be enhanced, as compared to an electrical accelerator interlocked mechanism.

The tractor 1 according to this embodiment includes the PTO clutch 25, the PTO clutch switch 67, and the switch operation link 66. The PTO clutch 25 transmits power of the engine 105 to the work machine in one state and shuts off transmission of the power of the engine 105 from the work machine in another state. The PTO clutch switch 67 switches the PTO clutch 25 between transmission and shut-off. The switch operation link 66 rotates when receiving an operating force through the reverse rotation shaft 52, and operates the PTO clutch switch 67 such that the PTO clutch 25 shuts off transmission of power.

In this manner, an operation of the work machine can be automatically stopped in reverse travel.

In the tractor 1 according to this embodiment, a transmission mechanism that transmits an operating force applied to the reverse pedal 16 to the hydro-static transmission 120 includes a portion with a backslash in coupling (freely fitting link 54). When the reverse pedal 16 is rotated from the neutral position to the side away from the operator, the switch operation link 66 causes the PTO clutch 25 to shut off power transmission, and then, the operating force applied to the reverse pedal 16 is transmitted to the hydro-static transmission 120.

In this manner, an operation of the work machine can be automatically stopped before reverse travel starts.

The tractor 1 according to this embodiment includes the cruise control operation tool 13, the fixed engagement portion 84, the movable engagement portion 85, and the brake pedal 17. The cruise control operation tool 13 is a member that enables the operator to perform an operation of fixing a gear-shift state of the hydro-static transmission 120. The fixed engagement portion 84 is connected to the forward rotation shaft 42, and rotates integrally with the forward rotation shaft 42. The movable engagement portion 85 is supported on the base portion 141, and by operation on the cruise control operation tool 13, moves to be engaged with the fixed engagement portion 84, thereby fixing the forward rotation shaft 42. The movable engagement portion 85 moves away from the fixed engagement portion 84 with an operating force that rotates the brake pedal 17 in the direction away from the operator.

Accordingly, since structures for cruise control are also supported on the base portion 141, mechanisms concerning the pedals can be concentrated.

The tractor 1 according to this embodiment includes the brake transmission link 72 and the brake interlocked portion 86. The brake transmission link 72 transmits an operating force applied to the brake pedal 17. The brake interlocked portion 86 is connected to the rotation shaft 81 of the cruise control operation tool 13. When the brake transmission link 72 presses the brake interlocked portion 86, the cruise control operation tool 13 thereby rotates and causes the movable engagement portion 85 to move away from the fixed engagement portion 84.

In this manner, cruise control can be canceled with a mechanical configuration.

The foregoing description is directed to the preferred embodiment of the present invention, and the configuration described above may be changed, for example, as follows.

The shapes and arrangement of members described above are an example, and may be different from those in the embodiment.

Although the hydro-static transmission 120 is used as a transmission device in the embodiment, a mechanical transmission device may be used.

Although the forward pedal 15 and the reverse pedal 16 are disposed at the right in the embodiment, the forward pedal 15 and the reverse pedal 16 may be disposed at the left. In this case, the forward rotation shaft 42 and the reverse rotation shaft 52 are oriented to tilt toward the rear of the vehicle body as approaching the outside (left) of the vehicle body 2.

In the configuration of the embodiment described above, the hydro-static transmission 120, the accelerator operation tool 12, and the PTO clutch switch 67 operate by mechanical transmission of operating forces of the forward pedal 15 and the reverse pedal 16. Alternatively, the forward pedal 15 and the reverse pedal 16 may be provided with potentiometers, for example, so that electrical control can be performed in accordance with rotation angles of the forward pedal 15 and the reverse pedal 16. The forward rotation shaft 42 may be disposed inside the reverse rotation shaft 52. The position of the shaft center may be different between the forward rotation shaft 42 and the reverse rotation shaft 52.

The present invention is also applicable to a work vehicle other than a tractor (e.g., a rice transplanter or a combine harvester).

REFERENCE SIGNS LIST 1 tractor (work vehicle)
15 forward pedal
16 reverse pedal
17 brake pedal
41 forward pedal arm
42 forward rotation shaft
51 reverse pedal arm
52 reverse rotation shaft
60 accelerator interlocked mechanism
90 operating force transmission mechanism
91 coupling link
120 hydro-static transmission (transmission device)
140 pedal mechanism
141 base portion

The invention claimed is:

1. A work vehicle comprising:
a floor configured for a foot of an operator of the work vehicle to be placed thereon, the floor having a first insertion hole and a second insertion hole;
a forward pedal arm placed in the first insertion hole and provided with a forward pedal;
a reverse pedal arm placed in the second insertion hole and provided with a reverse pedal;
a forward rotation shaft oriented at an outer end thereof toward a rear of a vehicle body of the work vehicle, the forward rotation shaft configured to serve as a rotation shaft of the forward pedal arm;
a reverse rotation shaft oriented at an outer end thereof toward a rear of the vehicle body, the reverse rotation shaft configured to serve as a rotation shaft of the reverse pedal arm;
a base portion attached to the floor and configured to support the forward pedal arm, the reverse pedal arm, the forward rotation shaft, and the reverse rotation shaft;
a coupling link configured to rotate in a first direction when a first operating force is applied to the forward pedal and configured to rotate in a second direction when a second operating force is applied to the reverse pedal, the first direction opposite the second direction, the coupling link including a biasing member configured to bias the coupling link in the second direction when the first operating force is applied to the forward pedal and configured to bias the coupling link in the first direction when the second operating force is applied to the reverse pedal; and
a transmission device configured to perform gear shift in accordance with an operating force applied to each of the forward pedal and the reverse pedal.

2. The work vehicle according to claim 1, wherein:
when the forward pedal is rotated in the direction away from the operator, the first operating force that rotates the forward pedal in the direction away from the operator is configured to be transmitted to the reverse pedal through the coupling link so that the reverse pedal rotates toward the operator, and
when the reverse pedal is rotated in the direction away from the operator, the second operating force that rotates the reverse pedal in the direction away from the operator is configured to be transmitted to the forward pedal through the coupling link so that the forward pedal rotates toward the operator.

3. The work vehicle according to claim 1, wherein:
the forward rotation shaft and the reverse rotation shaft have a common center position, the work vehicle further comprises:
a forward interlocked link configured to rotate when receiving an operating force through the forward rotation shaft;
a reverse interlocked link configured to rotate when receiving an operating force through the reverse rotation shaft; and
an accelerator interlocked mechanism supported on the base portion, the accelerator interlocked mechanism being configured to increase an engine speed of the work vehicle when receiving an operating force through the forward interlocked link or the reverse interlocked link.

4. The work vehicle according to claim 3, further comprising:
an accelerator operation tool configured to enable the operator to perform an operation of increasing of the engine speed,
wherein the accelerator interlocked mechanism includes
an accelerator interlocked link provided so as to be rotatable independently of the forward rotation shaft and the reverse rotation shaft, the accelerator interlocked link being configured to receive an operating force through the forward interlocked link or the reverse interlocked link, and
an accelerator interlocked wire connecting the accelerator interlocked link to the accelerator operation tool.

5. The work vehicle according to claim 1, further comprising:
a power-take off (PTO) clutch configured to perform transmission of engine power to a work machine in one state and to perform shut-off of transmission of the engine power from the work machine in another state;
a PTO clutch switch configured to switch the PTO clutch between the transmission and the shut-off of transmission; and a switch operation link configured to rotate when receiving an operating force through the reverse rotation shaft to operate the PTO clutch switch such that the PTO clutch performs the shut-off of transmission.

6. The work vehicle according to claim 5, further comprising:
a transmission mechanism that is configured to transmit an operating force applied to the reverse pedal to the transmission device and that has a backlash in coupling,
wherein, when the reverse pedal is rotated from a neutral position to the direction away from the operator, the PTO clutch is configured to perform the shut-off of transmission by the switch operation link, and then, the operating force applied to the reverse pedal is configured to be transmitted to the transmission device.

7. The work vehicle according to claim 1, further comprising:
a cruise control operation tool configured to enable the operator to perform an operation to fix a gear-shift state of the transmission device;
a fixed engagement portion connected to the forward rotation shaft, the fixed engagement portion being configured to rotate integrally with the forward rotation shaft;
a movable engagement portion supported on the base portion, the movable engagement portion being configured to move with an operation on the cruise control operation tool to be engaged with the fixed engagement portion, thereby fixing the forward rotation shaft; and
a brake pedal,
wherein the movable engagement portion is configured to move away from the fixed engagement portion with an operating force that rotates the brake pedal in the direction away from the operator.

8. The work vehicle according to claim 7, further comprising:
a brake transmission link configured to transmit an operating force applied to the brake pedal; and
a brake interlocked portion connected to a rotation shaft of the cruise control operation tool,
wherein when the brake transmission link presses the brake interlocked portion, the cruise control operation tool is configured to rotate and cause the movable engagement portion to move away from the fixed engagement portion.

* * * * *